United States Patent [19]

Sobel

[11] 3,928,486

[45] *Dec. 23, 1975

[54] ALKYLATION PROCESS WITH FLUORINATION STEP UTILIZING HF CATALYST AND HYDROCARBON POLYMER

[75] Inventor: Jay E. Sobel, Highland Park, Ill.

[73] Assignee: Universal Oil Products Company, Des Plaines, Ill.

[ * ] Notice: The portion of the term of this patent subsequent to Oct. 29, 1991, has been disclaimed.

[22] Filed: Apr. 8, 1974

[21] Appl. No.: 458,639

Related U.S. Application Data

[60] Division of Ser. No. 366,832, June 4, 1973, which is a continuation-in-part of Ser. No. 190,020, Oct. 18, 1971, abandoned.

[52] U.S. Cl. ............................................ 260/683.49
[51] Int. Cl.$^2$.......................................... C07C 3/54
[58] Field of Search.................. 260/683.49, 683.48

[56] References Cited
UNITED STATES PATENTS

| | | | |
|---|---|---|---|
| 2,307,799 | 1/1943 | Linn.............................. | 260/683.48 |
| 2,387,162 | 10/1945 | Matuszak....................... | 260/683.48 |
| 2,434,000 | 1/1948 | Matuszak....................... | 260/683.49 |
| 3,408,419 | 10/1968 | Herber et al.................... | 260/683.48 |
| 3,845,158 | 10/1974 | Sobel............................. | 260/683.49 |

FOREIGN PATENTS OR APPLICATIONS 592,345  9/1947  United Kingdom............ 260/683.48

Primary Examiner—Delbert E. Gantz
Assistant Examiner—G. J. Crasanakis
Attorney, Agent, or Firm—James R. Hoatson, Jr.; Thomas K. McBride; William H. Page, II.

[57] ABSTRACT

A process for producing alkyl fluorides from $C_3$–$C_5$ mono-olefins. An olefin is contacted with a liquid solution containing about 40–65 weight percent hydrogen fluoride and about 60–35 weight percent of a hydrogen fluoride-soluble hydrocarbon of higher molecular weight than the olefins to provide an alkyl fluoride product, without adverse side reactions such as polymerization of the olefin or alkylation of the olefin with isoparaffin which may be present during the reaction. The alkyl fluoride thus produced may subsequently be employed to produce an alkylation reaction product by reaction of the alkyl fluoride with an isoparaffin using a liquid hydrogen fluoride catalyst containing about 70–95 weight percent hydrogen fluoride.

9 Claims, 1 Drawing Figure

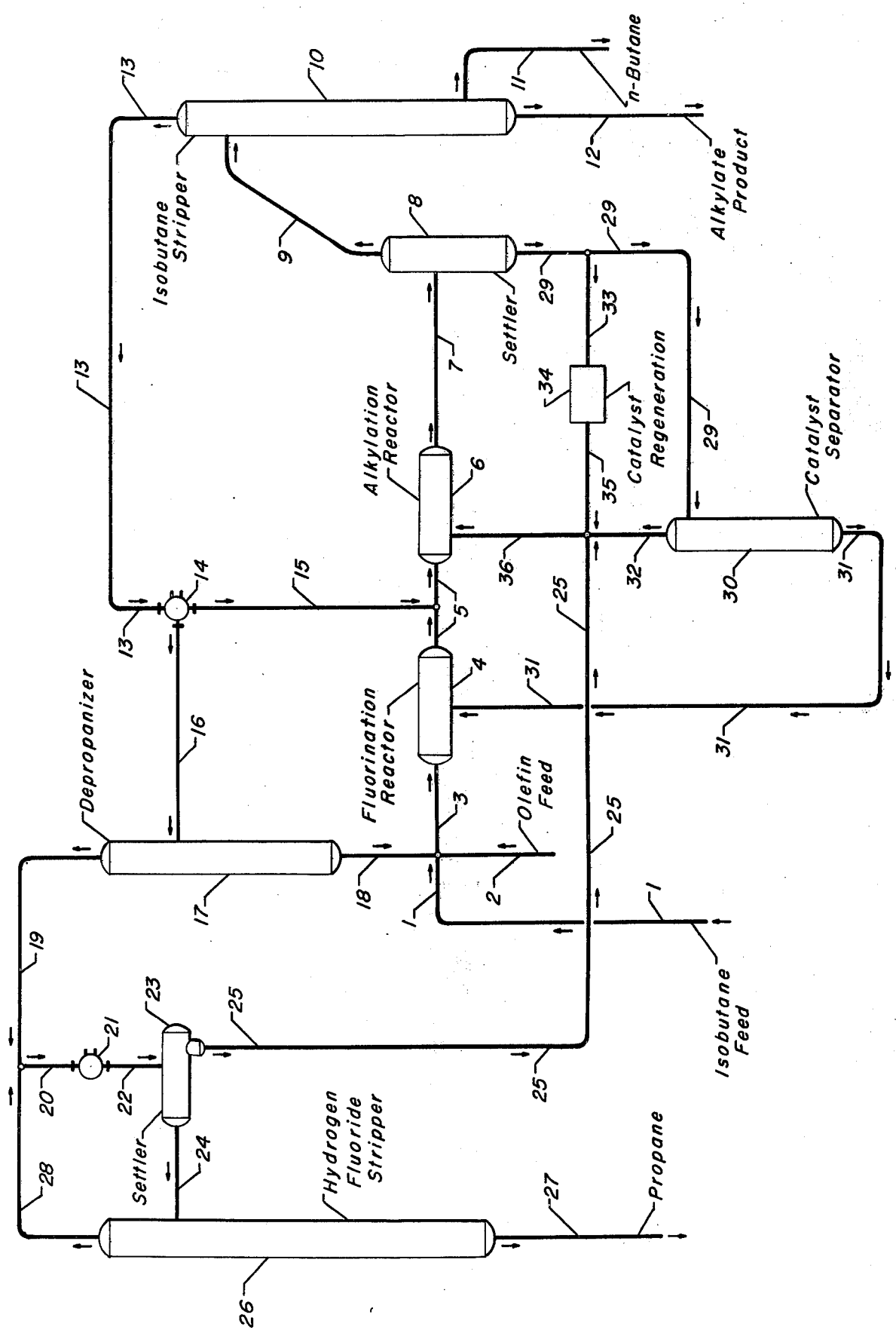

ALKYLATION PROCESS WITH FLUORINATION STEP UTILIZING HF CATALYST AND HYDROCARBON POLYMER

CROSS-REFERENCE TO RELATED APPLICATIONS

This application is a division of my copending application Ser. No. 366,832, filed on June 4, 1973, which is, in turn, a continuation-in-part of my copending application Ser. No. 190,020, filed on Oct. 18, 1971, now abandoned, all the teachings of both of which are incorporated herein.

BACKGROUND OF THE INVENTION

This invention relates to a process for producing an alkyl fluoride from a $C_3$–$C_5$ mono-olefin. More spcifically, this invention relates to a process for producing an alkyl fluoride from a $C_3$–$C_5$ mono-olefin using liquid phase hydrogen fluoride having in solution therein a hydrocarbon diluent.

This invention further relates to a two-step process for producing an alkylation reaction product from a $C_3$–$C_5$ monoolefin and an isoparaffin by, first, producing an alkyl fluoride from the olefin, and second, reacting the alkyl fluoride with the isoparaffin to provide the alkylation reaction product.

This invention further relates to a process for producing motor fuel alkylate of superior octane rating than has been heretofore possible.

Alkylation of isoparaffinic hydrocarbons, such as isobutane and isopentane, with mono-olefinic hydrocarbons, such as propylene, butylenes and amylenes, is well known as a commercially important method for producing gasoline boiling range hydrocarbons. The isoparaffinic $C_5$–$C_{10}$ hydrocarbons generally produced in commercial alkylation systems are termed "alkylate." Alkylate is particularly valuable as motor fuel blending stock because of its high octane ratings, and is typically employed in motor fuel production in order to improve the overall octane ratings of available gasolines boiling range hydrocarbons produced in other petroleum refining operations. A continuing goal in the art is to provide an alkylate product having higher motor and research octane ratings than can be produced in conventional alkylation operations.

It is known in the alkylation art that the commercial alkylate product produced by the alkylation reaction between butene-1 and isobutane has a lower octane rating than the commercial alkylate product produced by the reaction of butene-2 with isobutane or of isobutylene with isobutane. It has been found that, if butene-1 is converted into a corresponding alkyl halide and the alkyl halide is subsequently reacted with isobutane, the alkylate product thereby produced possesses an octane rating comparable to the high octane rating of the products obtained by reacting butene-2 or isobutylene with isobutane. Various methods have been disclosed which attempted to utilize this property by forming an alkyl halide from butene-1 prior to the alkylation reaction. These previous attempts to provide an alkyl halide by, for example, fluorination of butene-1 have generally been unsuccessful and have suffered from defects of impracticality, complication and expense of operation. Thus, no commercial processes have, until the present, successfully employed fluorination of butene-1 and subsequent alkylation to provide a higher quality alkylate product.

Among the first methods proposed for producing an alkyl fluoride by reacting an olefin such as butene-1 with hydrogen fluoride was simply to contact the olefin with liquid phase hydrogen fluoride and to allow the fluorination reaction to proceed. Simple mixing of an olefin with liquid hydrogen fluoride has been found to be quite unsatisfactory as a method for producing an alkyl fluoride from the olefin. When the olefin employed is propylene, simple mixture of hydrogen fluoride and propylene does produce, besides a large amount of undesirable propylene polymer, some propyl fluoride, provided that the amount of hydrogen fluoride employed is carefully limited to the exact stoichiometric amount (or less) of hydrogen fluoride required to react with the propylene. When the olefin employed is a butylene, however, simply admixing the butylene with liquid phase hydrogen fluoride results almost solely in undesirable polymerization of the olefin. Polymerization of the olefin is a particularly undesirable side reaction because it produces very low octane products and heavy side products and because it uses up excessive amounts of the relatively valuable olefin. Regardless of whether the amount of liquid phase hydrogen fluoride employed is or is not limited to the exact stoichiometric amount required to react with the butylenes (or even less hydrogen fluoride) previous attempts to produce alkyl fluorides from butylenes by simply contacting the butylenes with liquid hydrogen fluoride have been unsuccessful. These early attempts to produce alkyl fluorides from olefins by direct contact of the olefins with liquid hydrogen fluoride proved unsuccessful for two reasons. First, when the olefin alone was contacted with the liquid hydrogen fluoride, little or no alkyl fluoride and a great deal of olefin polymer were produced, as stated above. Secondly, the olefin to be reacted was generally economically available only in admixture with at least some isoparaffin, usually isobutane. When it was attempted to produce an alkyl fluoride from an olefin diluted with an isoparaffin using this early method of direct contact of the olefin isoparaffin mixture with liquid phase hydrogen fluoride, "run-away" alkylation of the isoparaffin with the olefin was found to occur in all cases, in addition to the other undesirable side reaction, polymerization of the olefin. It was found that undesirable, run-away polymerization and alkylation side reactions occurred when even a trace of a liquid hydrogen fluoride phase was present during the fluorination operation. Thus, attempts to produce commercially an alkyl fluoride from an olefin by simply contacting the olefin with liquid hydrogen fluoride were generally unsuccessful.

Later, a different method was proposed for producing an alkyl fluoride from an olefin using hydrogen fluoride. It was found that the run-away side reactions, such as olefin polymerization and alkylation, could be avoided by contacting the olefin to be converted to an alkyl fluoride with hydrogen fluoride while the hydrogen fluoride was present in the form of a saturated solution in isobutane or isopentane. Unfortunately, several factors combined to render this method of producing alkyl fluorides commercially impractical. The solubility of hydrogen fluoride in isobutane or isopentane is extremely low, even at relatively high temperatures. For example, the maximum amount of hydrogen fluoride which will remain in solution in isobutane at 150°F. is about 2 weight percent under the most ideal conditions, and much less under typical commercial conditions. Thus about 20 barrels of hydrogen fluoride-saturated isobutane would have to be supplied at the relatively high temperature of 150°F. in order to provide even the stoichiometric amount of hydrogen fluoride needed to produce an alkyl fluoride from 1 barrel of butylenes. This alone would make such a method less than economically desirable in a commercial operation. In addition, the difficulty of maintaining such a controlled saturated solution of hydrogen fluoride in an isoparaffin is obvious to those skilled in the art. When using a hydrogen fluoride-saturated isoparaffin to produce an alkyl fluoride from an olefin, there is a constant danger of the presence of, or creation of, a liquid hydrogen fluoride phase during the fluorination reaction, which would generate the run-away side reactions. Thus, previous attempts to produce an alkyl fluoride from an olefin using hydrogen fluoride have proved unsuccessful, and commercial embodiments of olefin fluorination are not presently used in the alkylation art.

In general, commercial isoparaffin-olefin alkylation processes employ isobutane and sometimes isopentane as the isoparaffinic reactant and use propylene, butylenes or amylenes as the olefinic reactant. Catalysts which have been utilized include hydrogen fluoride, sulfuric acid, and other like acidic or acid-acting materials. In alkylation operations using hydrogen fluoride as the catalyst, the olefin, isoparaffin and hydrogen fluoride catalyst are typically contacted at a catalyst/hydrocarbon volume ratio of about 1:1 to about 2:1 and agitated in an alkylation reactor to form a reaction mixture. The reaction mixture is made up of an emulsion or dispersion of the hydrocarbons in the catalyst, the hydrocarbons being generally immiscible with the catalyst. After the alkylation reaction is substantially complete, the reaction mixture is withdrawn from the alkylation reactor and is settled, resulting in distinct hydrocarbon and catalyst phases. The catalyst thus separated is recycled to the alkylation reactor for further use. The hydrocarbon phase produced in the settling operation is further processed, typically by fractionation, to recover the higher molecular weight alkylate product and to separate unconsumed isoparaffin for further use by recycle to the alkylation reactor. Conventional hydrogen fluoride alkylation catalyst contains about 75 weight percent or more of titratable hydrogen fluoride, about 5 weight percent or less water, with the remainder of the catalyst being made up of high molecular weight organic compounds which are completely soluble in liquid phase hydrogen fluoride. These higher molecular weight hydrocarbons are termed "organic diluents." They are well known in the alkylation art. In general, it has been found that, by utilizing as an alkylation catalyst hydrogen fluoride in which a specific fraction of these organic compounds are dissolved, undesirable side reactions in the alkylation process may be inhibited and an improved alkylation reaction product recovered. The fraction of organic diluent utilized in hydrogen fluoride alkylation catalysts is maintained between about 5 weight percent and about 25 weight percent of the catalyst in normal operation. If organic diluent is employed in hydrogen fluoride catalyst in alkylation operations at a concentration greater than about 25 to about 30 weight percent, the alkylation reaction will not proceed. Thus, the amount of organic diluent compounds present in the hydrogen fluoride catalyst must be regulated strictly to keep it at a level above 70 weight percent for alkylation operations. Regulation of the amount of organic diluent in the hydrogen fluoride catalyst in commercial alkylation processes is generally accomplished by passing a portion of the catalyst to a catalyst regenerator, whereby the hydrogen fluoride-soluble organic materials are separated from the hydrogen fluoride. The purified hydrogen fluoride is then returned to the alkylation operation and the heavy organic materials are removed from the alkylation process. Examples of organic diluents and their use in conventional alkylation operations may be found in U.S. Pat. Nos. 3,408,419 and 3,538,183. The organic diluent may be artificially prepared or may be prepared in situ by reaction of hydrogen fluoride with organic material such as olefins. For example, isobutylene polymer produced by contacting isobutylene with hydrogen fluoride is a suitable organic diluent for use in conventional alkylation. Similarly, polycyclic aromatic compounds of suitable molecular weight have been found to be suitable organic diluents for use with hydrogen fluoride to form a suitable hydrogen fluoride catalyst for use in commercial isoparaffin-olefin alkylation operations. Conventional alkylation operations utilizing a hydrogen fluoride catalyst containing about 65 weight percent to about 95 weight percent of in situ-generated organic diluent are also described in British Pat. No. 592,345. The essential characteristics of organic diluents are their complete solubility in liquid phase hydrogen fluoride and their molecular weight, which is higher than the molecular weights of alkylate products and of the isoparaffinic and olefinic reactants used in an alkylation process. Thus, organic diluents must have a molecular weight above about 150 and generally it is preferred that they have a molecular weight between about 200 and about 500. The solubility of organic diluent compounds in liquid phase hydrogen fluoride is in direct contrast to isobutane, isopentane and alkylate hydrocarbons which are substantially insoluble in liquid hydrogen fluoride, and form separate hydrocarbon phases when admixed with liquid phase hydrogen fluoride in any substantial amount. Organic diluents have also been termed "catalyst soluble oils." The term "organic diluent" is herein limited to hydrocarbons which are completely soluble in liquid phase hydrogen fluoride and which are of higher molecular weight than the reactants and products in commercial alkylation processes.

SUMMARY OF THE INVENTION

An object of this invention is to provide a process for producing an alkyl fluoride from a $C_3$–$C_5$ olefin.

Another object of this invention is to provide a process for producing an alkyl fluoride from an olefin using liquid phase hydrogen fluoride.

Another object of this invention is to provide a process for producing an alkyl fluoride from an olefin using liquid phase hydrogen fluoride without substantial polymerization of the olefin.

Another object of the present invention is to provide a process for producing an alkyl fluoride from an olefin diluted with an isoparaffin, without substantial alkylation reaction of the isoparaffin with the olefin, using liquid phase hydrogen fluoride to provide the alkyl fluoride.

Another object of the present invention is to provide a process for producing an alkyl fluoride from an olefin using hydrogen fluoride, without employing hydrogen fluoride in the form of a saturated solution in a low molecular weight isoparaffin.

Another object of the present invention is to provide a process for producing high octane alkylate hydrocarbons from an olefin and an isoparaffin by, first, producing an alkyl fluoride from the olefin and, subsequently, alkylating the isoparaffin with the alkyl fluoride.

In one embodiment, the present invention relates to a process for producing an alkyl fluoride from a mono-olefin which comprises contacting the mono-olefin, at fluorination conditions, with a liquid solution comprising from about 40 weight percent to about 65 weight percent of hydrogen fluoride and from about 60 weight percent to about 35 weight percent of a hydrogen fluoride-soluble hydrocarbon of higher molecular weight than the mono-olefin, and recovering the alkyl fluoride product from the resulting mixture.

In another embodiment, the present invention relates to a process for producing a higher molecular weight isoparaffinic product from a lower molecular weight mono-olefin and a lower molecular weight isoparaffin which comprises the steps of: contacting the mono-olefin, in a fluorination zone at fluorination conditions, with a first liquid solution comprising from about 40 weight percent to about 65 weight percent of hydrogen fluoride and from about 60 weight percent to about 35 weight percent of a hydrogen fluoride-soluble hydrocarbon of higher molecular weight than the mono-olefin; and, contacting the resulting alkyl fluoride, in an alkylation zone at alkylation conditions, with the lower molecular weight isoparaffin and with a second liquid solution comprising from about 70 weight percent to about 95 weight percent of hydrogen fluoride and from about 30 weight percent to about 5 weight percent of the hydrogen fluoride-soluble hydrocarbon of higher molecular weight than the product, to produce an alkylation reaction product from the isoparaffin and the alkyl fluoride, and recovering the alkylation reaction product from the resulting mixture as the isoparaffinic product.

I have discovered that by utilizing a high concentration of hydrogen fluoride-soluble, high molecular weight hydrocarbons in a liquid hydrogen fluoride phase, it is possible to employ such a liquid hydrogen fluoride phase directly in contact with a mono-olefin to fluorinate the mono-olefin. This procedure is in contrast to previously disclosed methods for fluorinating an olefin in which it has been found necessary to employ hydrogen fluoride in solution in an isoparaffinic hydrocarbon and carefully to avoid formation of a separate liquid hydrogen fluoride phase during the fluorination operation. This discovery, when utilized in the process of the present invention, makes possible the use of fluorination of an olefin as a part of an isoparaffin-olefin alkylation process, without the costly and complicated operations and equipment required by previously disclosed fluorination methods, and without the excessive requirements for a diluent low molecular weight isoparaffin which have also been required in previous fluorination operations.

Various other objects and advantages of the process of this invention will be apparent to those skilled in the art from the following description of the drawing and detailed description of the invention.

DESCRIPTION OF THE DRAWING

The attached drawing is a schematic representation of an embodiment of the process of the present invention. The drawing is not to be considered to constitute a limitation on the generally broad scope of the present invention nor to limit the embodiments of the invention to the one thereby represented.

Referring to the drawing, isobutane feed is introduced into the system through conduit 1. Butene-1 is introduced through conduit 2. The hydrocarbons in conduits 1 and 2 are commingled in conduit 3 at an isobutane/butene-1 mole ratio of about 6:1, and charged via conduit 3 into fluorination reactor 4. In reactor 4, the hydrocarbons are intimately contacted with a liquid solution comprising about 50 weight percent of hydrogen fluoride and about 50 weight percent of a hydrogen fluoride-soluble hydrocarbon comprising polymers of butylenes and having molecular weights in the range from about 200 to about 500. Fluorination reactor 4 is preferably equipped with mixing means, which may be baffle plates, perforated trays, mechanical stirring apparatus or the like, in order to thoroughly contact the substantially immiscible hydrocarbon and hydrogen fluoride phases. The temperature in reactor 4 is maintained at about 70°F. and the pressure is maintained at a level sufficient to provide liquid phase operations. The hydrogen fluoride-butylenes polymer solution from conduit 31 is charged to reactor 4 at a relative rate of about 1.5 times the rate (by volume) at which the isobutanebutene-1 hydrocarbon mixture from conduit 3 is charged to fluorination reactor 4. After a residence time of about 10 minutes, the resulting mixture of isobutane, alkyl fluoride and hydrogen fluoride-butylenes polymer solution is passed out of reactor 4 into conduit 5. Isobutane from conduit 15 is also passed into conduit 5. The mixture in conduit 5 is then charged into alkylation reactor 6. Substantially pure hydrogen fluoride is charged to alkylation reactor 6 through conduit 36 and combined with the hydrogen fluoride-butylenes polymer solution from conduit 5. The pure hydrogen fluoride is charged to reactor 6 at a rate sufficient to provide a hydrogen fluoride-butylenes polymer solution in reactor 6 which contains about 90 weight percent hydrogen fluoride and about 10 weight percent isobutylene polymer. The hydrogen fluoride-butylenes polymer solution formed in reactor 6 thus contains a sufficient hydrogen fluoride concentration to act as a conventional hydrogen fluoride alkylation catalyst. A temperature of about 70°F. and a pressure sufficient to provide liquid phase operations are maintained in reactor 6. The volumetric ratio of hydrogen fluoride-butylenes polymer solution (which acts as a conventional alkylation catalyst in reactor 6) to hydrocarbons in reactor 6 is maintained at about 1.5:1. As a result of increasing the hydrogen fluoride concentration in the hydrogen fluoride-butylenes polymer solution to a level above about 70–75 weight percent, the alkyl fluorides formed from butene-1 in reactor 4 are caused to react with isobutane in an alkylation reaction in reactor 6, to form higher molecular weight isoparaffinic alkylate products. After a residence time in reactor 6 of about 10 minutes, the mixture of hydrogen fluoride-butylene polymer solution, isobutane and alkylate products is withdrawn and passed through conduit 7 into settler 8. The alkylate product and unconsumed isobutane in the effluent from reactor 6 form an upper, hydrocarbon phase in settler 8 and are withdrawn from the upper end of settler 8 through conduit 9 and charged to isobutane stripper 10. The isobutane stripper 10, n-butane, which enters the alkylation system as an inert diluent in the isobutane and butene-1 feeds, is separated and withdrawn as a side cut through conduit 11. The $C_5$ and heavier alkylate product is separated and recovered in the bottoms from stripper 10 by way of conduit 12. Isobutane and any hydrogen fluoride and lighter gases are withdrawn overhead from stripper 10 through conduit 13 and charged to partial condenser 14. In partial condenser 14, isobutane is liquefied and withdrawn via conduit 15. The isobutane in conduit 15 is charged to conduit 5 and commingled therein with the effluent from fluorination reactor 4. The non-condensed portion of the charge to partial condenser 14 is withdrawn through conduit 16 and charged to depiopanizer 17. In depropanizer 17, isobutane is separated and withdrawn in the bottoms through conduit 18 and commingled with fresh isobutane and butene-1 in conduit 3. Hydrogen fluoride, propane and any lighter gases in depropanizer 17 are withdrawn overhead and charged, via conduits 19 and 20, to heat exchanger 21. The cooled effluent from heat exchanger 21 is charged through conduit 22 to settler 23. In settler 23, a lower, pure hydrogen fluoride phase separates and is withdrawn via conduit 25. An upper hydrocarbon phase which forms in settler 23 is withdrawn and charged through conduit 24 to hydrogen fluoride stripper 26. In stripper 26, propane is separated and withdrawn in the bottoms and recovered as a side product of the process through conduit 27. Hydrogen fluoride, mixed with some propane, is withdrawn overhead from stripper 26 and charged via conduit 28 and 20 to heat exchanger 21. Referring again to settler 8, hydrogen fluoride and hydrogen fluoride-soluble butylenes polymers in the effluent from reactor 6, which are charged to settler 8 through conduit 7, form a lower phase in settler 8, and are withdrawn through conduit 29 and charged to fractionator 30. In fractionator 30, substantially pure hydrogen fluoride is separated and withdrawn overhead as a vapor through conduit 32. A liquid solution containing about 50 weight percent hydrogen fluoride and about 50 weight percent of hydrogen fluoride-soluble isobutylene polymers is withdrawn from the lower end of fractionator 30 via conduit 31 and charged to fluorination reactor 4. A slip stream of the hydrogen fluoride-isobutylene polymer mixture in conduit 29 is passed through conduit 33 to conventional catalyst regeneration unit 34. Pure hydrogen fluoride is recovered from regeneration unit 34 and passed through conduit 35 into conduit 36. The streams of substantially pure hydrogen fluoride in conduits 25, 32 and 35 are combined to form one stream of pure hydrogen fluoride in conduit 36 which is charged to alkylation reactor 6.

DETAILED DESCRIPTION OF THE INVENTION

Alkyl fluorides may be produced from a variety of olefins using the process of the present invention. Suitable olefins include propylene, butene-1, butene-2, isobutylene, pentene-1, pentene-2, isoamylenes, hexenes, etc., as well as other linear, cyclic and branched-chain mono- and polyolefins. The present process is particularly suitable for producing alkyl fluorides from $C_3$–$C_5$ mono-olefins, especially from butene-1. Thus, the present process may be employed to obtain propyl fluoride from propylene, tertiary butyl fluoride from isobutylene, secondary butyl fluoride from butene-1 or butene-2, and pentyl fluorides from pentenes. The $C_3$–$C_5$ olefins preferably employed in the present process are generally commercially available only in the form of a mixture with diluent hydrocarbons such as propane, n-butane, isobutane, pentanes, etc. It is preferred to employ in the present process olefins which are thus conventionally diluted with, for example, isoparaffins, normal paraffins or other inert diluent hydrocarbons which are substantially insoluble in liquid phase hydrogen fluoride, since thus diluent hydrocarbons facilitate recovery of alkyl fluorides from the hydrogen fluoride-containing solution.

In the process of this invention an alkyl fluoride is produced from an olefin by contacting the olefin with a liquid phase solution containing hydrogen fluoride and certain types of hydrogen fluoride-soluble hydrocarbons within a specified range of concentrations which are more fully described hereinafter. It is essential to the satisfactory operation of the fluorination process of this invention that the relative concentrations of hydrogen fluoride and hydrogen fluoride-soluble hydrocarbons in this liquid solution are held within the specified ranges of concentrations as taught herein. If the concentration of hydrogen fluoride in the solution employed in producing an alkyl fluoride from an olefin is allowed to exceed about 65 weight percent while in contact with the olefin, the result will be undesirable side reactions involving the olefin, such as polymerization of the olefin and/or alkylation reaction of the olefin with any diluent isoparaffin present in the olefin feed stock used. If the concentration of hydrogen fluoride in the solution is allowed to fall below about 40 weight percent, little or no reaction of hydrogen fluoride with the olefin or any sort will generally occur when the olefin feed is mixed with the liquid hydrogen fluoride-containing solution, so that the production of alkyl fluoride from the olefin will proceed only very slowly or not at all. In addition to hydrogen fluoride, the remainder of the liquid solution consists essentially of a completely hydrogen fluoride-soluble hydrocarbon. Preferably, aside from the essential hydrogen fluoride and hydrogen fluoridesoluble hydrocarbon components of the solution, other extraneous components such as water, lower molecular weight hydrocarbon, etc., comprise altogether less than about 2 weight percent of the solution. Thus, the combined hydrogen fluoride and hydrogen fluoride-soluble hydrocarbon components preferably comprise at least about 98 weight percent of the solution used in producing an alkyl fluoride in the present process. It is to be understood that the solution of hydrogen fluoride and hydrogen fluoride-soluble hydrocarbon used in the present process for producing an alkyl fluoride is a true solution and not a mixture or emulsion of hydrogen fluoride with a hydrocarbon (such as isobutane or isopentane, which are substantially insoluble in the hydrogen fluoride).

The hydrogen fluoride-soluble hydrocarbons which may be utilized as a component of the liquid phase solution employed in the fluorination operation of the present invention are those hydrocarbons, having molecular weight between about 150 and 600, which are mutually soluble with liquid phase hydrogen fluoride. Preferably, the hydrogen fluoride-soluble hydrocarbons employed have molecular weights in the range from about 200 to about 500. The hydrogen fluoride-soluble hydrocarbons utilized must be completely mutually soluble with liquid hydrogen fluoride at hydrogen fluoride/hydrocarbon weight ratios from about 2:3 to about 2:1. Thus, for example, $C_3$–$C_{10}$ paraffins and isoparaffins are not suitable for use, since they have neither requisite molecular weight nor the necessary solubility in liquid phase hydrogen fluoride. Suitable hydrocarbons for use with hydrogen fluoride in the liquid solution include those hydrocarbons whose use as organic hydrogen fluoride catalyst diluents is known in the isoparaffin-olefin alkylation art. Examples of suitable hydrocarbons include polymers of isobutylene, polymers of butene-1, polymers of butene-2, polymers of propylene, polymers of pentenes, polycyclic aromatic compounds such as indanes, indenes, naphthalenes, anthracenes, etc., polymers derived from terpenes such as pinene, terpenenes, etc., or mixtures thereof. Other suitable hydrogen fluoride-soluble hydrocarbons are those formed during a conventional hydrogen fluoride alkylation operation which tends to accumulate in the hydrogen fluoride catalyst phase during such a conventional operation. In conventional isoparaffin-olefin alkylation operations, the liquid hydrogen fluoride catalyst phase is regulated to maintain the titratable hydrogen fluoride content of the catalyst above 70 weight percent, and to maintain the hydrogen fluoride soluble hydrocarbon (organic diluent) content of the catalyst, below about 30 weight percent. It is well known in the alkylation art that the catalytic properties of liquid phase hydrogen fluoride, with respect to the isoparaffin-olefin alkylation reaction, are very poor when the hydrogen fluoride concentration in the alkylation catalyst falls below about 70 weight percent and when the hydrogen fluoride-soluble hydrocarbon concentration in the catalyst rises above about 30 weight percent.

Fluorination conditions employed in the present process include a temperature of from about 0°F. to about 150°F. and a pressure of from about 1 atmosphere to about 40 atmospheres or more. Preferred fluorination conditions include a temperature between about 50°F. and about 125°F. and a pressure sufficient to maintain the olefin feed, the solution of hydrogen fluoride and hydrogen fluoride-soluble hydrocarbon, alkyl fluoride products, etc., in the liquid phase. The olefin feed employed is contacted with the hydrogen fluoride-containing solution at an olefin feed/solution volume ratio of about 1:100 to about 5:1. The term "olefin feed" as used herein includes any hydrogen fluoride-insoluble diluent hydrocarbons with which the olefin to be converted is mixed, as is the case in commercial olefin feed stocks. Such diluents may include paraffins, isoparaffins, etc. A preferred olefin feed/solution volume ratio is between about 1:2 and about 1:1. It is preferred that the olefin feed utilized contain at least some hydrogen fluoride-insoluble diluent hydrocarbons, such as $C_3$–$C_5$ paraffins or isoparaffins. Such diluent hydrocarbons may be present in the olefin feed at a diluent hydrocarbon/olefin mole ratio of about 0.1:1 to about 20:1. The olefin feed and the hydrogen fluoride-containing liquid solution are contacted for about 0.1 minute to about 60 minutes in a suitable fluorination zone. A contact time of from about 1 minute to about 20 minutes is preferred. The olefin feed and the hydrogen fluoride-containing solution are charged to a suitable fluorination zone (which may be conventional alkylation reactor) and contacted therein. Fluorination conditions preferably include some means for agitating the olefin feed and the hydrogen fluoride-containing solution to ensure intimate contact of the olefin with the solution. The olefin feed generally forms a separate phase from the liquid hydrogen fluoride-containing solution, so that some mixing or stirring means should generally be used to provide adequate contact between these phases. Such means may include, for example, mechanical stirring apparatus, baffle sections in the reactor employed, perforated trays, column packing, etc. The fluorination operation may be performed in a batch-type operation or in a continuous-type operation. Because of known economic advantages and simplicity of performance, a continuous operation is preferred for the fluorination step. In such a continuous operation, olefin feed and hydrogen fluoride-containing solution are continuously charged to a suitable reactor, mixed therein for a contact time between about 0.1 minute and about 60 minutes, and thereafter removed. The fluorination zone employed in such an operation may be any vessel, reactor, or suitable container which is capable of containing the olefin feed and the hydrogen fluoride containing solution at the above described fluorination conditions. For example, many conventional alkylation reactors disclosed in prior art are suitable for use.

The alkyl fluoride products produced in the fluorination operation of this invention generally form a separate phase from the liquid phase hydrogen fluoride and hydrogen fluoride-soluble hydrocarbon after the fluorination reaction takes place. When the hydrogen fluoride-containing solution is removed from the fluorination reactor the alkyl fluoride may be recovered from the liquid hydrogen fluoride solution by conventional settling, if desired. Generally, however, it is desired to employ the alkyl fluorides which are produced in the fluorination step for further reaction in the alkylation of an isoparaffin in order to produce high octane gasoline components. In the present process, the alkyl fluorides produced in the fluorination operation may be conveniently passed directly to a conventional alkylation operation while remaining admixed with the separate phase containing hydrogen fluoride and hydrogen fluoridesoluble hydrocarbon. Conventional hydrogen fluoride alkylation catalysts can be produced from the solution of hydrogen fluoride and hydrogen fluoride-soluble hydrocarbon which is used in the fluorination operation of this invention by simply mixing the fluorination solution with sufficient substantially pure hydrogen fluoride to increase the hydrogen fluoride content of the solution to greater than 70 weight percent of the total solution. Thus, when the fluorination operation of this invention is combined with an alkylation operation for reacting the alkyl fluoride product of the fluorination step with an isoparaffin in order to provide an alkylation reaction product, the alkyl fluoride may, in one embodiment, be passed directly to the alkylation step while in admixture with the hydrogen fluoride and the hydrogen fluoride-soluble hydrocarbon used in the fluorination step. Pure hydrogen fluoride is then added to the hydrogen fluoride-containing solution to produce a conventional hydrogen fluoride alkylation catalyst (greater than 70 weight percent hydrogen fluoride) from the hydrogen fluoride-containing solution previously used in the fluorination step. The alkyl fluoride is thereby caused to undergo the alkylation reaction in the alkylation zone. Alternatively, the alkyl fluoride can be simply recovered after the reaction by a conventional settling operation. Thus, the alkyl fluoride may be separated from the hydrogen fluoride-containing solution and subsequently passed to an alkylation operation or other desired use. Any alkyl fluoride which remains in solution with the hydrogen fluoride and hydrogen fluoride-soluble hydrocarbon may be recovered by contacting such a solution with a liquid $C_3$–$C_5$ saturated hydrocarbon. The alkyl fluoride will remain in the hydrocarbon phase and can then be separated from the hydrogen fluoride-containing solution by settling.

Alkylation zones which may suitably be employed when an alkylation step is combined with the fluorination operation of this invention, may be any alkylation reactor which will suitably contain and intimately contact the alkyl fluoride produced in the fluorination operation with an isoparaffin such as isobutane or isopentane and with a conventional alkylation catalyst. Among the suitable alkylation zones are large numbers of alkylation reactors disclosed in prior art. Such alkylation reactors typically include means for intimately contacting an alkylatable hydrocarbon with the alkylating agent. The alkylation step preferably employed in this process may be performed as a batch operation or a continuous operation. It is preferred for ease of performance and economy that a continuous operation be employed in the alkylation step. The alkyl fluoride, conventional hydrogen fluoride catalyst, and the isoparaffin are continuously mixed in an alkylation reactor and the resulting reaction mixture, comprising alkylation reaction products, conventional hydrogen fluoride catalyst, hydrogen fluoride-soluble hydrocarbons, and any unconsumed isoparaffin, is continuously withdrawn from the reactor. When an alkylation step is employed in the present process, alkylation conditions utilized include a temperature in the range from about 0°F. to about 200°F. and a pressure in the range from about 1 atmosphere to about 40 atmospheres. The mole ratio of isoparaffin to total alkylating agent (including alkyl fluorides, olefins, etc.) present in the alkylation zone is maintained in the range from about 0.1:1 to about 25:1. Other conventional alkylation conditions such as a catalyst/hydrocarbon volume ratio in the reactor between about 0.1:1 and about 5:1 are employed. Contact time in the alkylation zone is maintained between about 0.1 minute and about 30 minutes. Particularly preferred alkylation conditions, when the alkylation step of the process of this invention is applied to the alkylation of isobutane with secondary butyl fluoride, include a temperature in the range from about 50°F. to about 150°F., a pressure in the range from about 5 atmospheres to about 10 atmospheres, and a catalyst/hydrocarbon weight ratio in the range from about 0.5:1 to about 2:1.

The hydrocarbon alkylation reaction product and excess isoparaffin which remains unreacted after the alkylation step are separated from the hydrogen fluoride catalyst after withdrawing the mixture of catalyst and hydrocarbons from the alkylation reactor. The mixture is allowed to stand unstirred, i.e., settled, and the alkylation reaction products, isoparaffin and any light gases form a lighter hydrocarbon phase, while the hydrogen fluoride catalyst, which contains hydrogen fluoride-soluble organic compounds, forms a heavier phase. These phases are easily mechanically separated. Subsequently, the isoparaffin and light gases are separated from the alkylation reaction product by fractionation and the reaction product is recovered. The isoparaffin and any hydrogen fluoride which is entrained in the hydrocarbon phase in the settling operation are conventionally recovered and recycled to the alkylation step and/or the fluorination step for further use.

The hydrogen fluoride catalyst phase recovered from the settling step in an alkylation operation is recycled directly to the reaction step in conventional alkylation operations, with a minor portion being withdrawn continuously or intermittently and passed to a conventional regeneration operation to remove excess water and excess hydrogen fluoride-soluble hydrocarbons. This regeneration is performed in order to regulate the strength of the catalyst to maintain the hydrogen fluoride content thereof above about 70 weight percent. If such regeneration operations were not employed in conventional alkylation operations, the concentration of hydrogen fluoride-soluble hydrocarbons would rise above 70 weight percent and would make the catalyst ineffective as an alkylation catalyst. In the process of the present invention, the catalyst phase recovered from the alkylation step may be further separated to provide the fluorination solution utilized with a $C_3$–$C_5$ olefin to provide the alkyl fluoride to be reacted in the alkylation step. The catalyst phase recovered from settling in the alkylation operation may be further separated to provide a relatively pure hydrogen fluoride stream and a stream containing a solution of hydrogen fluoride and hydrogen fluoride-soluble hydrocarbons suitable for use with a $C_3$–$C_5$ olefin in producing alkyl fluorides. Any suitable method may be employed to separate the conventional hydrogen fluoride catalyst to provide the substantially pure hydrogen fluoride stream and the hydrogen fluoride-hydrocarbon solution. One suitable and convenient method is to subject the settled hydrogen fluoride phase to fractionation, while recovering the overhead vapors which are substantially pure hydrogen fluoride. The liquids in the bottoms from the fractionation operation comprise a solution of hydrogen fluoride and hydrogen fluoride-soluble hydrocarbons. In some cases, using this embodiment of the present process, it will not be necessary to utilize all the settled hydrogen fluoride catalyst phase from the alkylation operation to provide the pure hydrogen fluoride stream and the hydrogen fluoride-hydrocarbon solution utilized in the fluorination operation. In such cases, a portion of the conventional hydrogen fluoride catalyst recovered from settling in the alkylation step may be recycled directly back into the alkylation reactor without further processing, in accordance with conventional practice in alkylation operations. The solution of hydrogen fluoride and hydrogen fluoride-soluble hydrocarbons which is recovered contains between about 40 weight percent and about 65 weight percent hydrogen fluoride and between about 60 weight percent and about 35 weight percent hydrogen fluoride-soluble hydrocarbons, in accordance with the required fluorination conditions. The solution is utilized to provide further alkyl fluorides from olefins as described above. Other sources of substantially pure hydrogen fluoride are available in conventional alkylation operations and may be similarly employed to provide a conventional hydrogen fluoride catalyst by increasing the strength of the hydrogen fluoride solution used in the fluorination step. For example the pure hydrogen fluoride streams recovered from the catalyst regeneration unit or a hydrogen fluoride stripper are suitable for use in increasing the strength of the hydrogen fluoride solution which is passed from the fluorination step to the alkylation step.

The scope of the present invention is intended to include embodiments wherein not only the alkyl fluoride produced in the fluorination operation but also any other suitable alkylating agents may be charged, simultaneously to the alkylation zone along with the alkyl fluorides produced in the fluorination step. Thus, a feed to the alkylation zone may contain such other alkylating agents as olefins, other alkyl halides, alcohols, etc., as well as the alkyl fluoride produced in the fluorination step. For example, when butene-1 is utilized in the fluorination step to produce secondary butyl fluoride, and the resulting secondary butyl fluoride is passed directly to an alkylation reactor, it is within the scope of the present invention to charge other olefins such as butene-2, propylene, etc., to the alkylation reactor simultaneously, to react both the secondary butyl fluorides and the olefins with an isoparaffin and subsequently to recover the various alkylation reaction products formed from the alkyl fluoride and the olefins in admixture as the product of the process.

EXAMPLE I

Three runs were undertaken in order to produce butyl fluorides from butylenes. The three runs used three different hydrogen fluoride-containing solutions. Each of these hydrogen fluoride-containing solutions had different concentrations of hydrogen fluoride and of hydrogen fluoride-soluble hydrocarbon. In each run, the hydrogen fluoride-soluble hydrocarbon employed was isobutylene polymer having a molecular weight of 200–500. These runs were undertaken in order to demonstrate the importance of the relative concentrations of hydrogen fluoride and hydrogen fluoride-soluble hydrocarbons in the solution employed to produce alkyl fluorides from olefins and to demonstrate the surprising and superior results obtained when the hydrogen fluoride and hydrogen fluoride-soluble hydrocarbon content of the hydrogen fluoride-containing solution is maintained within the ranges specified in the process of the present invention. Portions of the same mixed butylenes olefin feed stock were used in Runs A, B and C. In each of these runs, the olefin feed stock and the hydrogen fluoride-containing solutions were employed in continuous operations by continuously charging 3 parts (by volume) of the hydrogen fluoride-containing solution (30 cc. per minute) and 1 part of the olefin feed stock (20 cc. per minute) to a 500 cc. reaction vessel equipped with mechanical stirring means and with means for maintaining the contents of the vessel at a constant temperature. The mixture in the reaction vessel was agitated therein for a reaction time of about 10 minutes and then continuously removed. The hydrogen fluoride-containing solution were separated from the alkyl fluorides and hydrocarbons by settling and the alkyl fluoride-hydrocarbon phase was then analyzed to determine the amount of butyl fluorides produced and the amount of undesirable side reactions which had taken place, as shown by the production of $C_5+$ hydrocarbons. The operating conditions and results in Runs A, B and C are shown in Table I. Referring to Table I it is apparent that Run A and Run B, which were performed in accordance with the process of the present invention, both produced significantly larger amounts of butyl fluoride products then did Run C. In Run C, the hydrogen fluoride concentration in the hydrogen fluoride-containing solution was somewhat above the limit specified for use in the process of the present invention, and was within the range of conventional alkylation catalyst. It is also apparent from Table I that only very small amounts of heavy ($C_5+$) hydrocarbons were produced by undesirable side reaction, such as polymerization of butylenes and primarily alkylation of isobutane with butylene, in Runs A and B, whereas very large amounts of these undesirable heavy side products were produced in Run C. It is thus apparent that maintaining the hydrogen fluoride concentration in the solution utilized in the fluorination operation within the range specified by the present invention, as in Runs A and B, and maintaining the concentration of the solution below the concentration which was used in Run C is essential for two reasons. First, the yield of the desired butyl fluoride products is about two to five times greater in Runs A and B than in Run C. Second, the production of undesirable heavy side reaction products is about four to about twenty times greater in Run C than in Runs A and B.

TABLE I

| HF-Hydrocarbon Solution Composition (Wt.%) | Run A | Run B | Run C |
|---|---|---|---|
| HF | 39 | 59 | 69 |
| HF-Soluble Hydrocarbon | 60 | 40 | 30 |
| $H_2O$ | 1 | 1 | 1 |
| Olefin Feed (Mole %) | | | |
| Butene-1 | 3.7 | 3.7 | 3.7 |
| Butene-2 | 8.3 | 8.3 | 8.3 |
| Isobutylene | 4.7 | 4.7 | 4.7 |
| Isobutane | 83.3 | 83.3 | 83.3 |
| Reaction Conditions | | | |
| Temperature, °C. | 20 | 20 | 20 |
| HF Solution/Olefin Feed Volume Ratio | 3/2 | 3/2 | 3/2 |
| Reaction Time, Minutes | 10 | 10 | 10 |
| Products (Wt.%) | | | |
| Tertiary Butyl Fluoride | 2.8 | 1.6 | 0.6 |
| Secondary Butyl Fluoride | 1.8 | 8.5 | 1.4 |
| $C_5+$ Hydrocarbons | 0.9 | 3.9 | 17.9 |

EXAMPLE II

Three runs were undertaken using butene-1 as the olefin to be converted to a butyl fluoride product. These three runs were performed in order to demonstrate, first, that the presence of a specified concentration of hydrogen fluoride-soluble hydrocarbon in solution with hydrogen fluoride is essential to provision of adequate results in the fluorination of an olefin using liquid phase hydrogen fluoride, and, second, that the concentration of hydrogen fluoride-insoluble, $C_3$–$C_{10}$ diluent hydrocarbons present during the fluorination operation has little or no effect on the success of the operation without the use of the hydrogen fluoride-soluble hydrocarbon. In these three runs, isobutane was employed as the hydrogen fluoride-insoluble diluent hydrocarbon. Use of such hydrogen fluoride-insoluble diluents has little effect on the production of the desired alkyl fluoride products and has no significant effect in preventing undesirable side reactions such as olefin polymerization or alkylation. In Runs D and E the hydrogen fluoride-containing solution was prepared in accordance with the present invention by combining equal amounts, by weight, of pure hydrogen fluoride and of hydrogen fluoride-soluble isobutylene polymer having a molecular weight of 200–500. In Run F, the hydrogen fluoride solution was prepared by combining 9 parts of pure hydrogen fluoride, by weight, with 1 part water. In Runs D and F, the olefin feed employed was prepared by combining 1 part butene-1 with 12 parts of hydrogen fluoride-insoluble hydrocarbon diluent (in this case, isobutane). In order to demonstrate the relative lack of effect of the amount of hydrogen fluoride-insoluble hydrocarbon diluents, when used in the fluorination operation, the olefin feed employed in Run E was prepared by combining 1 part of butene-1 with only 6 parts of hydrogen fluoride-insoluble isobutane diluent, i.e., only one-half the concentration of hydrogen fluoride-insoluble hydrocarbon diluent which was used in Runs D and F. The same reaction vessel used in Runs A–C was also utilized in Runs D, E and F. In Runs D, E and F three parts of the hydrogen fluoride-containing solution (30 cc. per minute) and 2 parts of the olefin feed (20 cc. per minute), by volume, were continuously charged to the reaction vessel and the contents of the vessel were agitated for a reaction time of about 10 minutes. The contents were then continuously removed, and the hydrocarbon-alkyl fluoride phase was recovered by settling and analyzed to determine the amount of butyl fluorides produced and the amount of undesirable side reaction which had taken place, as evidence by the amount of $C_5+$ hydrocarbons produced in each run. The operating conditions and results from Runs D, E and F are shown in Table II. Referring to Table II, it is apparent that the amount of the desired butyl fluoride products which was produced in Run E, using only one-half as much hydrogen fluoride-insoluble isobutane diluent, is substantially the same as the amount of alkyl fluoride product produced in Run D. Thus, it is apparent that the relative concentration of hydrogen fluoride-insoluble hydrocarbon diluent is relatively unimportant in the fluorination operation. Comparing Runs D and E, which were performed according to the present invention, with Run F, which was not so performed, it is apparent that the use of the hydrogen fluoride-soluble hydrocarbon (in this case, isobutylene polymer) is essential to the provision of adequate results in a process for producing alkyl fluorides. Run F failed to produce any substantial amount of butyl fluoride product. Run F, however, produced very substantial amounts of undesirable $C_5+$ side products. It is to be noted that the hydrogen fluoride-insoluble isobutane diluent was present during Run F at the same concentration as in Run D, and at a higher concentration than in Run E. Yet, Run F failed to provide the desired alkyl fluoride products, and instead produced substantial amounts of undesirable heavy side products. Thus, the relative insignificance of hydrogen fluoride-insoluble hydrocarbon diluent is clearly apparent.

TABLE II

| HF-Hydrocarbon Solution Composition (Wt.%) | Run D | Run E | Run F |
| --- | --- | --- | --- |
| HF | 50 | 50 | 90 |
| HF-Soluble Hydrocarbon | 50 | 50 | — |
| $H_2O$ | — | — | 10 |
| Olefin Feed (Mole %) | | | |
| Butene-1 | 8.2 | 16.7 | 8.2 |
| Butene-2 | — | — | — |
| Isobutylene | — | — | — |
| Isobutane | 91.8 | 83.3 | 91.8 |
| Reaction Conditions | | | |
| Temperature °C. | 20 | 20 | 20 |
| HF Solution/Olefin Feed Volume Ratio | 3/2 | 3/2 | 3/2 |
| Reaction Time, Minutes | 10 | 10 | 10 |
| Products (Wt.%) | | | |
| Tertiary Butyl Fluoride | 0.1 | — | 0.3 |
| Secondary Butyl Fluoride | 4.6 | 4.6 | — |
| $C_5+$ Hydrocarbons | 0.1 | 3.6 | 14.4 |

EXAMPLE III

Three runs were undertaken to produce $C_8$ alkylation reaction products, in order to demonstrate the superiority of the process of the present invention when employed in a two-stage fluorination-alkylation procedure. In Runs G and H, the fluorination steps were the same as the fluorination operations in Runs D and E, respectively, as described in Example II. In Runs G and H the solutions of hydrogen fluoride and hydrogen fluoride-soluble hydrocarbons employed in the fluorination steps contain 50 weight percent hydrogen fluoride and 50 weight percent of hydrogen fluoride-soluble isobutylene polymers (molecular weight 200–500). In Run G, the olefin feed to the fluorination step contained 1 part, by weight, of butene-1, and 12 parts of hydrogen fluoride-insoluble isobutane diluent. In Run H, the olefin feed to the fluorination step contained 1 part by weight of butene-1 and 6 parts of hydrogen fluoride-insoluble isobutane diluent. In Run I, no fluorination step was undertaken. In order to provide a standard alkylation run for the purpose of comparison with Runs G and H, a portion of the same olefin feed which was used in Run G, (containing 1 part butene-1, and 12 parts isobutane) was employed in a conventional alkylation operation in Run I. In Runs G and H, the following procedure was employed. In the fluorination steps, three parts, by volume, (30 cc. per minute) of a hydrogen fluoride-isobutylene polymer solution containing 50 weight percent isobutylene polymer, and 2 parts of olefin feed (20 cc. per minute) were continuously charged to the reaction vessel and mixed therein for about 10 minutes reaction time. The contents of the reaction vessel were then removed and the hydrocarbon-alkyl fluoride phase was separated from the hydrogen fluoride-containing solution by settling. Further reaction was halted by immersing the hydrocarbon-alkyl fluoride solution in a dry ice bath. The hydrocarbon-alkyl fluoride solution was then analyzed. Subsequently, the hydrocarbon-alkyl fluoride phase was continuously charged to the reaction vessel at a rate of 20 cc. per minute. A conventional hydrogen fluoride alkylation catalyst was charged to the vessel at the rate of 30 cc. per minute, to provide a catalyst/hydrocarbon volume ratio of 3:2 in the reactor. The contents of the reactor were agitated for 10 minutes reaction and then continuously removed. The $C_8$ alkylate products were recovered by settling the hydrocarbon and catalyst phases, and were analyzed to determine their research and motor octane rating, and to determine the ratio of trimethylpentanes (TMP) to dimethylhexanes (DMH) in the alkylate. In Run I, only the alkylation step was performed. Two parts by volume of olefin feed (20 cc. per minute) and three parts (30 cc. per minute) of conventional hydrogen fluoride alkylation catalyst (containing 89 weight percent hydrogen fluoride alkylation catalyst (containing 89 weight percent hydrogen fluoride, 10 weight percent isobutylene polymer and 1 weight percent water) were charged continuously to the same reaction vessel used in previous runs and agitated therein for 10 minutes reaction time. The reactor contents were then continuously removed and the $C_8$ products were recovered by settling and analyzed. The operating conditions and results of Runs G, H and I are shown in Table III. Referring to Table III, it is apparent that the two-stage fluorination and alkylation process of Runs G and H, performed according to the present invention, provides a substantially superior $C_8$ alkylate product than can be produced by conventional alkylation methods, as used in Run I. It is to be noted in comparing Run H with Run I that the alkylation step in Run H utilized an isoparaffin/alkylating agent mole ratio only one-half as great as that used in Run I. Yet Run H produced an alkylation reaction product superior to that of Run I. It is well known in the alkylation art that, normally, alkylate quality improves in direct proportion to increased isoparaffin/alkylating agent mole ratios used in an alkylation operation. Thus, the superior quality of the alkylate produced in Run H, relative to Run I, is particularly surprising and advantageous.

TABLE III

| FLUORINATION STEP | Run G | Run H | Run I |
|---|---|---|---|
| HF-Hydrocarbon Solution Composition (Wt.%) | | | |
| HF | 50 | 50 | — |
| HF-Soluble Hydrocarbon | 50 | 50 | — |
| H$_2$O | — | — | — |
| Olefin Feed (Mole %) | | | |
| Butene-1 | 8.2 | 16.7 | 8.2 |
| Isobutane | 91.8 | 83.3 | 91.8 |
| Reaction Conditions | | | |
| Temperature °C. | 20 | 20 | — |
| HF-Solution/Olefin Feed Volume Ratio | 3/2 | 3/2 | — |
| Reaction Time, Minutes | 10 | 10 | — |
| ALKYLATION STEP | | | |
| HF-Alkylation Catalyst Composition (Wt.%) | | | |
| HF | 89 | 89 | 89 |
| HF-Soluble Hydrocarbon | 10 | 10 | 10 |
| H$_2$O | 1 | 1 | 1 |
| Reaction Conditions | | | |
| Temperature °C. | 20 | 20 | 20 |
| Catalyst/Hydrocarbon Volume Ratio | 3/2 | 3/2 | 3/2 |
| Reaction Time, Minutes | 10 | 10 | 10 |
| Product Properties | | | |
| RON | 97.0 | 94.2 | 93.7 |
| MON | 94.2 | 92.3 | 92.2 |
| TMP/DMH | 7.5 | 3.7 | 3.0 |

I claim as my invention:

1. A process for producing an alkylation reaction product from a lower molecular weight mono-olefin and a lower molecular weight isoparaffin, which comprises the steps of:
   a. contacting said mono-olefin, in a fluorination zone at fluorination conditions, with a first liquid solution comprising from about 40 weight percent to about 65 weight percent of hydrogen fluoride and from about 60 weight percent to about 35 weight percent of a hydrogen fluoride-soluble hydrocarbon polymer having a molecular weight of from about 200 to about 500, to produce an alkyl fluoride from said mono-olefin; and,
   b. contacting said alkyl fluoride produced in Step (a), in an alkylation zone at alkylation conditions, with said lower molecular weight isoparaffin and with a second liquid solution comprising from about 70 weight percent to about 95 weight percent of hydrogen fluoride and from about 30 weight percent to about 5 weight percent of said hydrogen fluoride-soluble hydrocarbon polymer, and recovering said alkylation reaction product from the alkylation reaction mixture.

2. The process of claim 1 wherein said mono-olefin is selected from butene-1, butene-2, and isobutylene.

3. The process of claim 1 wherein said lower molecular weight isoparaffin is selected from isobutane and isopentane.

4. The process of claim 1 wherein said first liquid solution comprises from about 50 weight percent to about 60 weight percent of hydrogen fluoride and from about 50 weight percent to about 40 weight percent of said hydrogen fluoridesoluble hydrocarbon polymer.

5. The process of claim 1 wherein said hydrogen fluoride-soluble hydrocarbon is a polymer of an olefin of from 3 to 5 carbon atoms.

6. The process of claim 5 wherein said polymer is a butene polymer.

7. The process of claim 5 wherein said polymer is an isobutylene polymer.

8. The process of claim 1 wherein said alkylation reaction mixture from the alkylation zone is separated into an upper hydrocarbon phase from which said alkylation reaction product is recovered and a lower phase comprising hydrogen fluoride and said hydrogen fluoride-soluble hydrocarbon polymer, vaporizing hydrogen fluoride from said lower phase and introducing the vaporized hydrogen fluoride to said alkylation zone, and recycling the unvaporized solution of hydrogen fluoride and said hydrogen fluoride-soluble hydrocarbon polymer hydrocarbon to said fluorination zone.

9. The process of claim 8 wherein said hydrogen fluoride-soluble hydrocarbon polymer is a polymer of an olefin of from 3 to 5 carbon atoms.

* * * * *